UNITED STATES PATENT OFFICE.

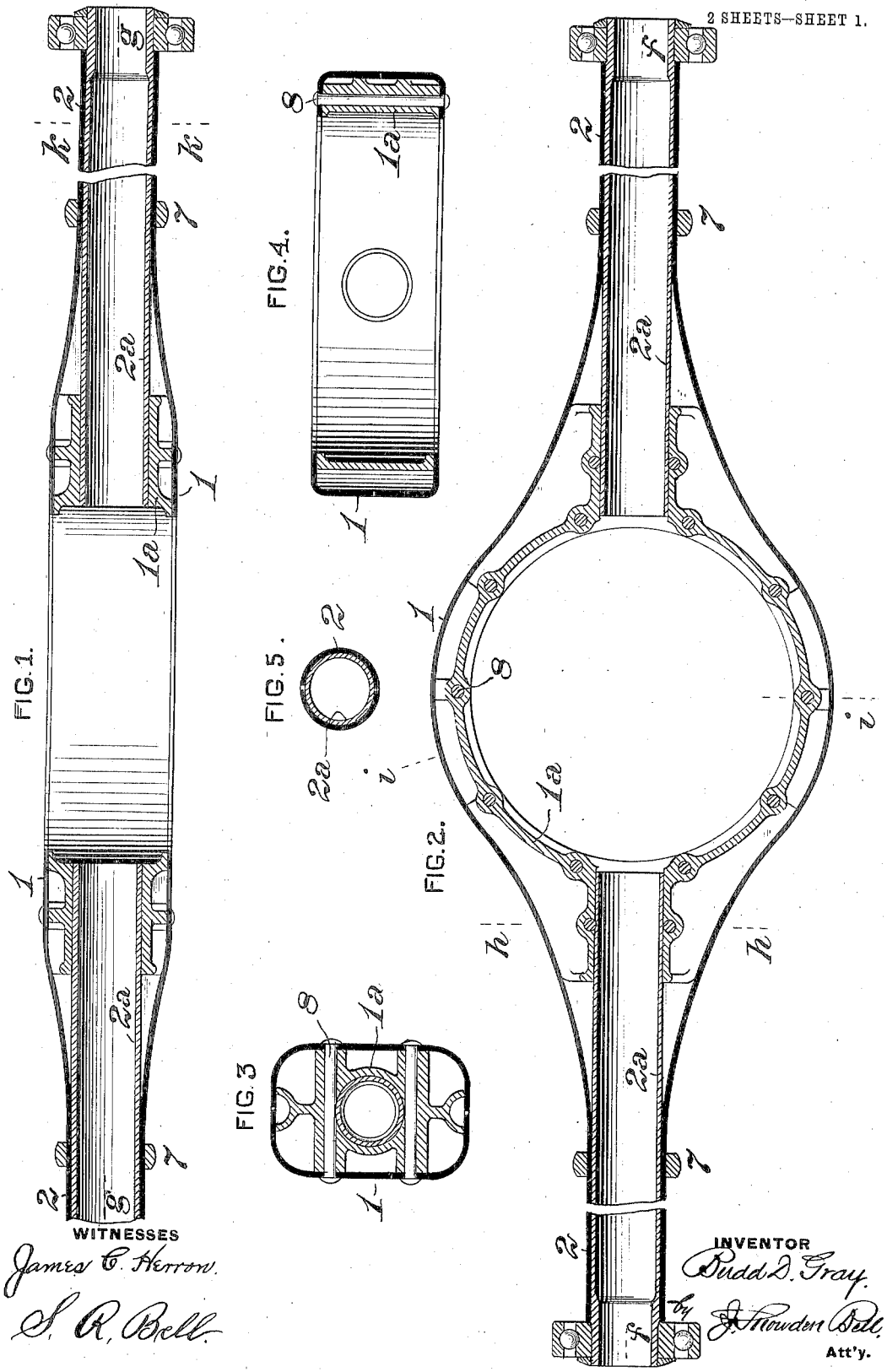

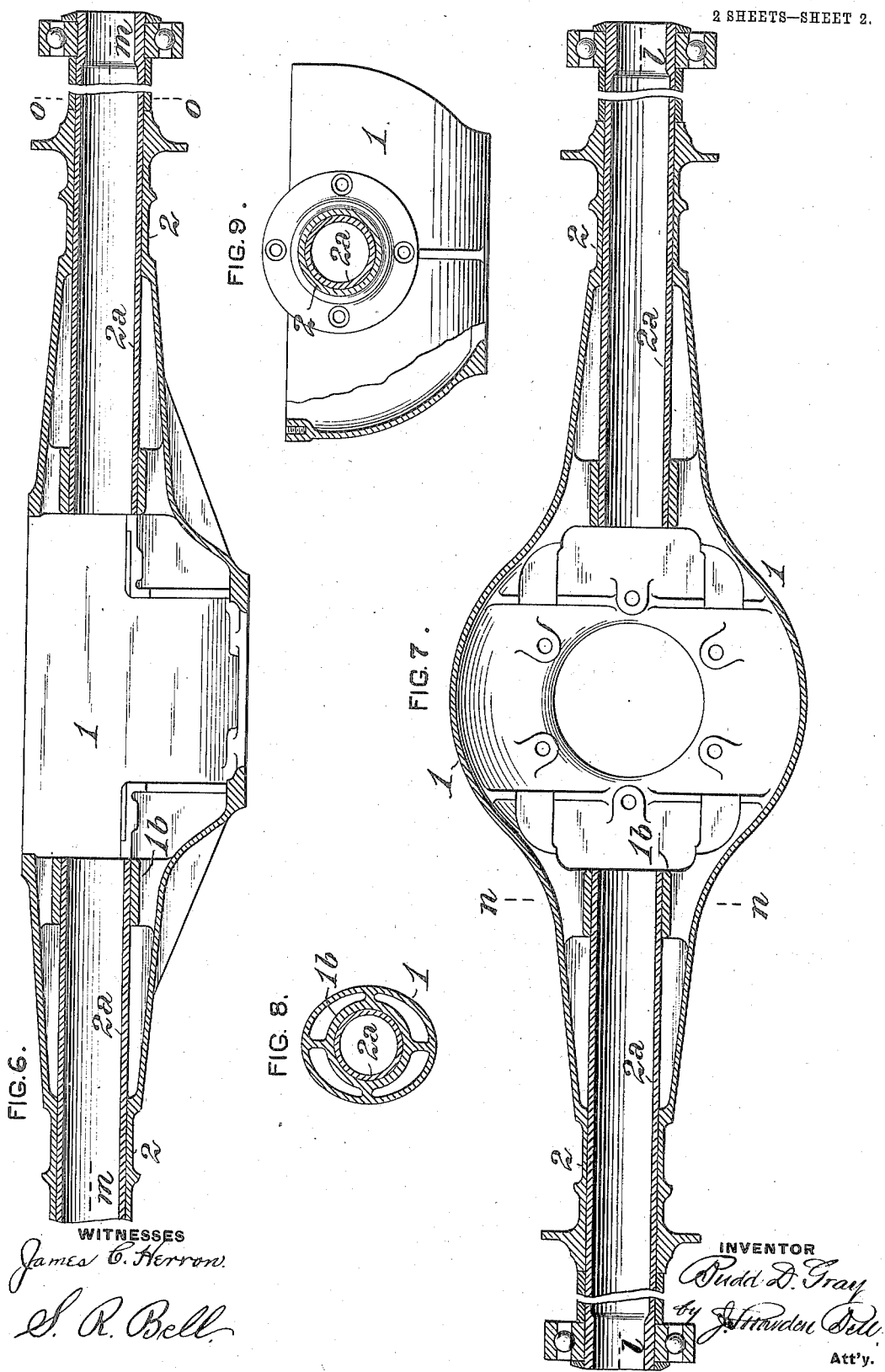

BUDD D. GRAY, OF PROVIDENCE, RHODE ISLAND, ASSIGNOR TO AMERICAN LOCOMOTIVE COMPANY, OF NEW YORK, N. Y., A CORPORATION OF NEW YORK.

SUPPORTING-AXLE FOR MOTOR-VEHICLES.

947,968.  Specification of Letters Patent.  Patented Feb. 1, 1910.

Application filed May 21, 1908, Serial No. 434,014. Renewed July 16, 1909. Serial No. 508,006.

*To all whom it may concern:*

Be it known that I, BUDD D. GRAY, of Providence, in the county of Providence and State of Rhode Island, have invented a certain new and useful Improvement in Supporting-Axles for Motor-Vehicles, of which improvement the following is a specification.

The object of my invention is to provide a supporting member for the bodies of motor vehicles and the driving mechanism thereof, which shall be of simple and comparatively inexpensive construction, afford proper and sufficient strength with a minimum of weight, and provide convenient facilities for the support and inclosure of the driving mechanism.

The improvement claimed is hereinafter fully set forth.

In the accompanying drawings: Figure 1 is a view, in longitudinal central section, on the line $f$ $f$ of Fig. 2, of a driving axle for motor vehicles illustrating an embodiment of my invention; Fig. 2, a view in longitudinal central section, on the line $g$ $g$ of Fig. 1, of the same; Figs. 3 and 4, transverse sections, on the lines $h$ $h$ and $i$ $i$, respectively, of Fig. 2; Fig. 5, a similar section, on the line $k$ $k$ of Fig. 1; Fig. 6, a longitudinal central section, on the line $l$ $l$ of Fig. 7, through a driving axle illustrating a structural modification; Fig. 7, a similar section, on the line $m$ $m$ of Fig. 6; Fig. 8, a transverse section, on the line $n$ $n$ of Fig. 7; and, Fig. 9, a similar section, taken partly at the middle of the axle and partly on the line $o$ $o$ of Fig. 6.

Referring first to Figs. 1 to 5 inclusive, in the practice of my invention, I provide a driving axle which is continuous from end to end, and consists of a central body, 1, of substantially annular form, the space within which serves as a receptacle for the driving gears, the differential mechanism and its bearings, etc., and tubular end portions, 2, 2, which project oppositely from, and in line axially with, the body, 1, and serve to case or inclose the sections of the driving member which transmits the power from the differential to the wheel hubs. The tubular end portions, 2, are formed of two similar sections of pressed steel, which inclose a central cast spacer, 1ª, fitting within the body, 1, and bored out on its opposite sides to receive tubular liners, 2ª, which are secured to it by shrinking, brazing, or riveting. The liners, 2ª, fit within, and project from the outer ends of, the tubular end portions, 2, and bands, 7, shrunk on the end portions, 2, serve to hold the parts firmly together. The body, 1, and spacer, 1ª, are connected by transverse rivets, 8, and after the parts are assembled the edges of the abutting sections of the pressed steel body and end portions are welded together by an acetylene and oxygen flame, or by other suitable means, thereby constituting a continuous inclosing and supporting member. It will be seen that a driving axle of the construction above described may be made of ample strength and of comparatively light weight, and that it conveniently provides all the necessary facilities for the location and inclosure of the driving mechanism.

As illustrated in Figs. 6 to 9 inclusive, the central body, 1, and tubular end portions, 2, of the axle, are formed of an integral casting of bronze or other suitable material. The body is made of larger size than in the instance before described and flattened on its sides, as shown in Figs. 6 and 9, so as to provide ample space for the inclosure of the driving mechanism, and merges into the end portions, 2, in elliptical section, as shown in Fig. 8. Tubular liners, 2ª, are inclosed in the end portions, as in the instance last above described, and are fixed, at their inner ends, in sockets, 1ᵇ, cast on the ends of the body, no spacer being used in this case, and, at their outer ends, in the concentric portion of the casing, 2. The body and end portions are preferably cast around the tubular liners, thereby insuring a perfectly tight fit and obviating the necessity of boring out the integral casting and fitting the tubular liners within it.

I claim as my invention and desire to secure by Letters Patent:

1. A supporting axle for motor vehicles, comprising a central, annular body adapted for the reception of driving mechanism, tubular supporting members continuous with and oppositely projecting from said central body, a spacer fixed in the central body, and tubular liners fixed in said supporting members and connected at their inner ends to said spacer.

2. A supporting axle for motor vehicles, comprising a central, annular body adapted for the reception of driving mechanism, a spacer secured within the same, tubular supporting members continuous with and oppositely projecting from said body, and tubular liners secured at their inner ends to said spacer and fitting tightly within said supporting members, from the ends of which they project.

3. A supporting axle for motor vehicles, comprising a central, annular body adapted for the reception of driving mechanism, tubular supporting members oppositely projecting from said body, an annular spacer secured within said body and having lateral cylindrical projections within said supporting members, tubular liners secured at their inner ends to said projections and extending through said supporting members, and bands shrunk on the outer ends of said supporting members and securing the same to the inclosed tubular liners.

4. A supporting axle for motor vehicles, comprising an annular spacer having lateral cylindrical projections, tubular liners secured at their inner ends to said projections, and an inclosing casing, composed of two similar pressed-steel sections welded together, comprising a central body surrounding said spacer and secured thereto, and tubular members surrounding said liners and secured thereto at their outer ends.

BUDD D. GRAY.

Witnesses:
GEORGE E. THURBER,
CHARLES A. WALSH.